Oct. 14, 1924.
J. H. CUNNINGHAM
1,511,659
ICE RUT CRUSHER
Filed Aug. 30, 1923    2 Sheets-Sheet 1
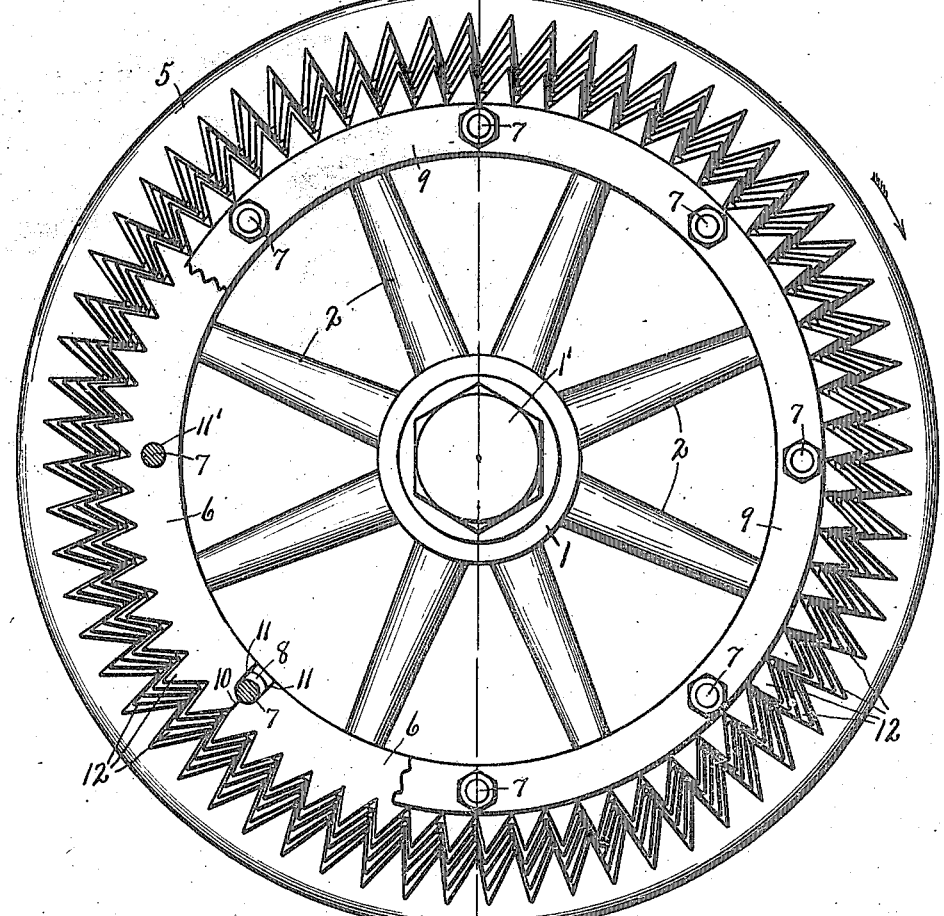
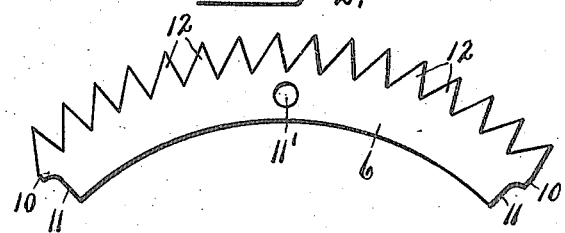
INVENTOR
J. H. Cunningham
BY Howard P. Denison
ATTORNEY

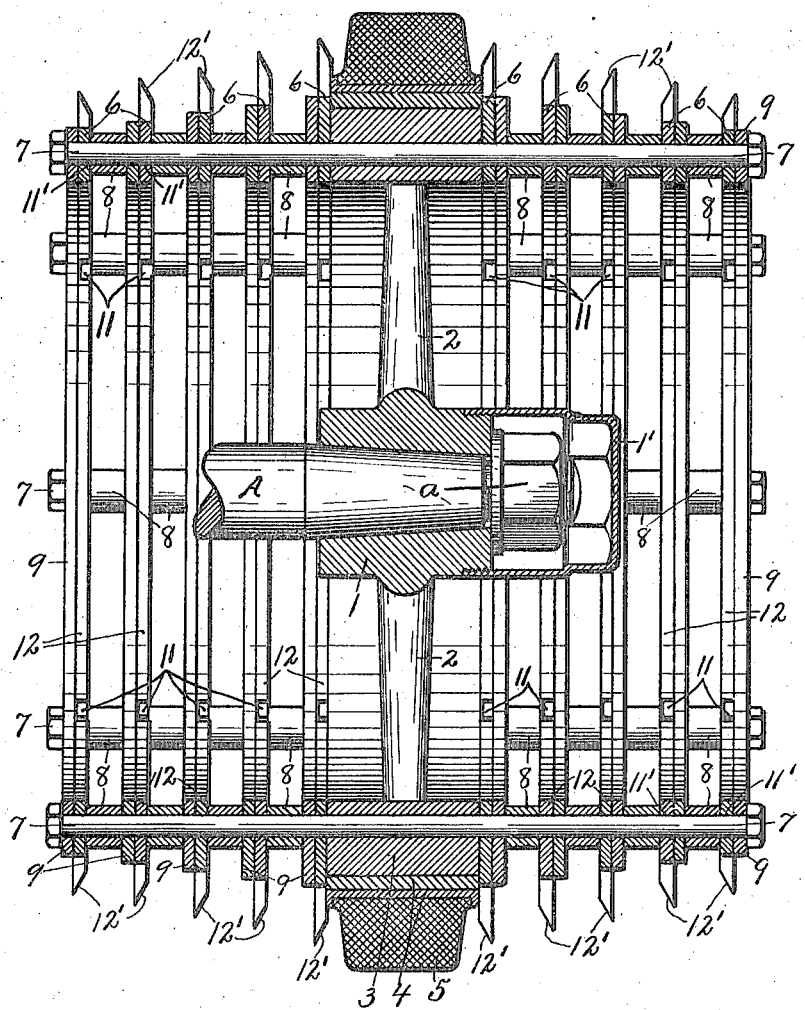

Patented Oct. 14, 1924.

1,511,659

UNITED STATES PATENT OFFICE.

JOHN H. CUNNINGHAM, OF SYRACUSE, NEW YORK.

ICE-RUT CRUSHER.

Application filed August 30, 1923. Serial No. 660,261.

*To all whom it may concern:*

Be it known that I, JOHN H. CUNNINGHAM, a citizen of the United States of America, of Syracuse, in the county of Onondaga, in the State of New York, have invented new and useful Improvements in Ice-Rut Crushers, of which the following, taken in connection with the accompanying drawings, is a full, clear, and exact description.

This invention relates to an ice rut crusher, preferably of the wheel type adapted to be used more particularly on road vehicles such as tractors and analogous relatively heavy machines in place of the usual wheel for crushing and leveling ice ridges along the sides of ruts as the machine is propelled along the road and thereby to enable other machines such as automobiles to be more easily directed to various parts of the roadway by the usual steering means.

The main object is to provide a strong and durable, and efficient wheel of this character capable of crushing and more or less leveling the ice ridges on both sides of an ice rut at one and the same time by simply propelling the wheel along the rut and thereby to remove the dangers and inconveniences incidental to the travel of automobiles and other vehicles along rutty roads.

Other objects and uses relating to specific parts of the wheel will be brought out in the following description.

In the drawings, Figure 1 is an outer end face view, partly in section and partly broken away of an ice rut crushing wheel embodying the various features of my invention.

Figure 2 is a face view of one of the segments of one of the toothed rings forming a part of the wheel shown in Figure 1.

Figure 3 is a longitudinal sectional view of the same wheel taken on line 3—3, Figure 1.

These wheels are preferably constructed for use on the axles as —A—, of Fordson tractors and other heavy machines in place of the usual traction or steering wheels commonly used on those machines so as to travel in the ruts made by automobiles and other vehicles of standard gage so that when propelled along the ruts, the wheel or wheels at each side of the machine will crush the ice, snow or other ridges at both sides of the rut on the corresponding side and thus produce more or less leveling of the road surface for the safe and convenient driving of other machines, and inasmuch as each wheel is of substantially the same construction, the description of one will be applicable to all.

As illustrated, each wheel comprises a hub —1—, spokes —2—, a felloe —3—, a rim —4— and a tire —5—, together with separate series of toothed rings —6—, clamped in a manner hereinafter described to opposite sides of the felloe —3—.

The hub —1— may be secured to the axle —A— by any suitable clamping means as for example, by a nut —a— on the end of the tapered portion of the shaft —A— and its outer end is provided with the usual protective cap —1'— inclosing the nut —a—.

The spokes —2— extend radially from and are preferably formed integral with the hub —1— and serve to support at their outer ends, the felloe —3— which may be secured in any suitable manner to said spokes and may be made of wood, metal or other practicable material.

The rim —4— is preferably made of steel or other strong and durable metal and is firmly secured to the periphery of the felloe —3—, the outer peripheral face of the rim being grooved for receiving and detaining the tire —5— which is preferably made of rubber, but may be made of any other suitable material capable of traveling in the rut.

The separate sets of toothed rings —6— are clamped in axially spaced relation to opposite sides or faces of the felloe —3—, by means of bolts —7— and spacing sleeves —8—, together with reinforcing rings —9—.

The rings —6— and —9— are concentric with the axis of revolution of the wheel, the toothed rings —6— of both sets being gradually reduced in diameter from the felloe in opposite directions and together with the rings —9— and sleeves —8—, constitute what may be termed, conical toothed drums having their larger ends adjacent the opposite faces of the felloe and of slightly less diameter than the tire —5— so as to gradually crush and level opposite walls of the rut as the tread of the tire rolls along in said rut.

Each of the toothed rings —6— is preferably composed of a series of, in this instance four, segments as shown in Figure 2, of equal circumferential length assembled end to end to abut along radial lines as —10—, for economy of manufacturing and accuracy of assembling and also to reduce the cost of repairs in case the teeth of any one segment should become broken or otherwise impaired in which event, that particular segment could be readily removed and replaced by a perfect segment without disturbing the segments of any of the other rings.

The meeting ends of the several segments of each ring —6— are recessed at —11— to receive alternate clamping bolts —7— while the intermediate portions of the same segments midway between their ends are provided with bolt openings —11'— for receiving the remaining clamping bolts which serve to hold the segments against outward radial displacement.

The recesses —11— in the meeting ends of the segments of each ring also constitute bolt openings, but extend outwardly from the inner edges thereof so that if it is desired to remove any impaired segment of any toothed ring, it is simply necessary to remove its central clamping bolt —7— and to loosen the clamping bolts at both ends thereof whereupon the impaired segment may be readily withdrawn outwardly by reason of the fact that the inner ends of the recesses —11— are open, after which a new segment may be inserted and the central bolt —7— restored, and the opposite end bolts tightened to hold the new segment in place.

The teeth as —12—, of each ring 6—6 are preferably pointed and chisel-shaped to form cutting edges having their beveled sides as —12'— facing inwardly or toward the felloe —3— so that when they are brought into engagement with the opposite sides of an ice or snow rut, the walls of said rut will be gradually crushed and the crushed material forced inwardly toward the bottom of the rut by the beveled sides —12'— thus tending to fill the rut with the crushed ice or snow simultaneously with the crushing of the walls of the rut, and thereby leveling off the surface of the road as the wheel is propelled along the rut to enable other machines such as automobiles and the like to be directed more safely and easily across the road bed.

The object in gradually reducing the diameters of the rings of both sets from the felloe in opposite directions, instead of making them all of the same diameter is to allow the tire —5— to ride in the bottom of the rut and at the same time, to keep the diameter of the rings adjacent the tire of nearly the same diameter as that of the tire, while on the other hand, if the rings were all of the same diameter as the larger ones adjacent the tire, the rings most remote from the tire would be liable to ride upon the high points of the ridges at opposite sides of the rut and thus prevent the inner rings from effectively crushing the walls of the rut adjacent the tire.

This conical construction of the toothed drums also causes the walls of the rut to be gradually crushed or chiseled out and thrown toward the center as the wheel travels along the rut.

That is, the larger rings adjacent the felloe chisel off relatively small portions of the ridges adjacent the base of the rut and enables the next succeeding rings to more readily chisel off the adjacent portions of said ridges so that the work of each ring is comparatively light while those of each set complete the level of the ridges and tend to throw the ice toward the center to further effect the leveling of the road bed.

The cutting edges of the teeth —12— of the several rings facing in the direction of rotation are more nearly radial than their opposite edges to not only increase the traction with the road surface, but also to more readily enter and chisel off the ice.

The rings —9— are continuous and are applied to the outer faces of the several toothed rings —6— across the meeting edges of the several segments to assist in holding said segments in operative position and also to brace the toothed rings, and are provided with bolt openings for receiving the bolts —7—.

The sleeves —8— are interposed between the outer faces of the reinforcing rings —9— and inner faces of the next adjacent toothed rings —6— for holding said toothed rings in axially spaced relation and thereby to afford clearance for the ice and snow which may be chiseled off by the teeth and also permitting the ice and snow to be readily cleared from between the rings, in case it should become clogged therein.

The wheel as a whole is also open from end to end within the rings —6— and —9— which have about the same interior diameter as that of the felloe, the bolts —7— being carried by the felloe and serve as the supporting means for the conical toothed drums which being hollow, enables any pulverized ice or snow which may pass through the spaces between the rings to readily escape from the ends of the wheel or outwardly through the spaces.

The construction of the wheel shown and described is particularly simple and efficient and may be manufactured at a comparatively low cost and used upon various standard tractors and trucks in place of the wheels usually provided therefor, thus extending the use of tractors and trucks without greatly increasing the expense for the additional use.

I claim:

1. In an ice and snow rut crusher, a wheel having a tire adapted to travel along and into the rut and provided with an axially extending drum having peripheral cutters for crushing the ice or snow ridge at one side of the rut.

2. In an ice and snow rut crusher, a wheel having a tire adapted to travel in the rut, said wheel being provided with drums extending axially in opposite directions from the tire, each drum being provided with peripheral teeth for crushing the ice and snow ridges at opposite sides of the rut.

3. An ice and snow rut crusher, as in claim 2, in which the drums are frusto-conical and arranged with their larger ends adjacent the tire.

4. In an ice and snow rut crusher, a wheel adapted to travel along the rut and provided with an axially extending drum having circumferential rows of teeth in axially spaced relation.

5. An ice and snow rut crusher, as in claim 4, in which the peripheral edges of the teeth are beveled axially.

6. An ice and snow rut crusher, as in claim 4, in which each tooth is tapered circumferentially to a point, and the points beveled transversely.

7. In an ice and snow rut crusher, a wheel having a tire adapted to travel in the rut, said wheel being provided with opposite axially extending drums, each drum comprising a series of segmental rings concentric with the axis of the wheel and each ring provided with peripheral teeth, and means for securing the rings in fixed relation to each other.

8. In an ice and snow rut crusher, a wheel having frusto-conical drums provided with peripheral teeth in axially spaced relation.

9. In an ice and snow rut crusher, a wheel having a felloe and a tire, said tire being adapted to travel in the rut, the wheel being provided with drums mounted upon and extending axially from opposite sides of the felloe and provided with peripheral teeth.

10. An ice and snow crusher, as in claim 9, in which the drums are frusto-conical and arranged with their larger ends adjacent the felloe.

11. An ice and snow rut crusher, as in claim 9, in which the sides of the teeth adjacent the felloe are beveled to form chisel cutting edges.

12. In an ice and snow crusher, a wheel having a felloe and a tire adapted to travel in the rut, said wheel being provided with drums mounted upon and extending axially in opposite directions from the felloe concentric with the axis of the wheel, each drum including a series of segmental rings in axially spaced relation, and each ring provided with peripheral teeth.

13. In an ice and snow rut crusher, a wheel having a felloe provided with a tire adapted to travel in the rut, drums mounted upon and extending axially in opposite directions from opposite sides of the felloe, each drum including a plurality of rings concentric with the axis of the wheel and of different diameters.

14. An ice and snow rut crusher, as in claim 13, in which means are provided for holding the rings in axially spaced relation.

In witness whereof I have hereunto set my hand this 23d day of August, 1923.

JOHN H. CUNNINGHAM.

Witnesses:
R. E. CHASE,
RITA CAMPOLIETO.